UNITED STATES PATENT OFFICE.

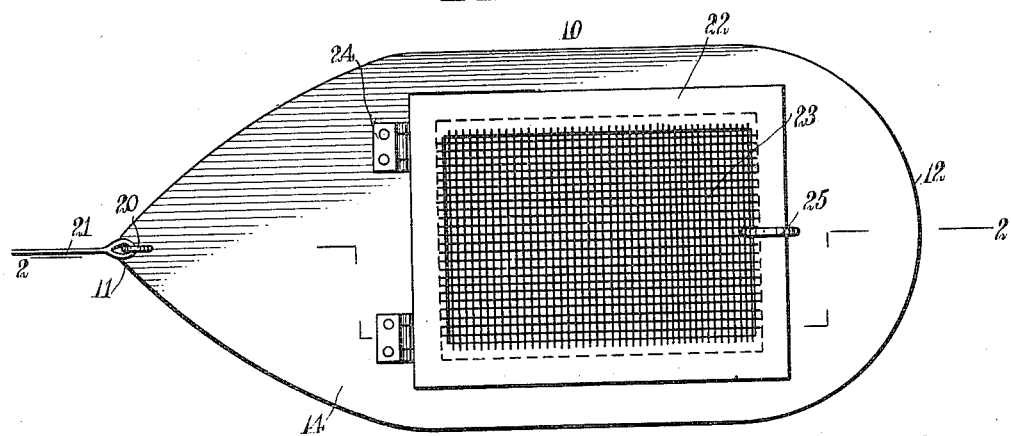
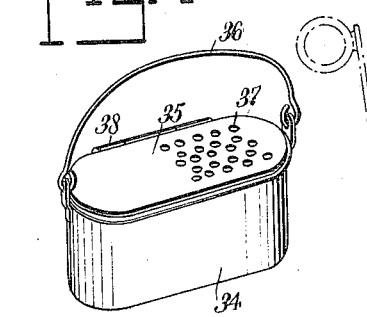
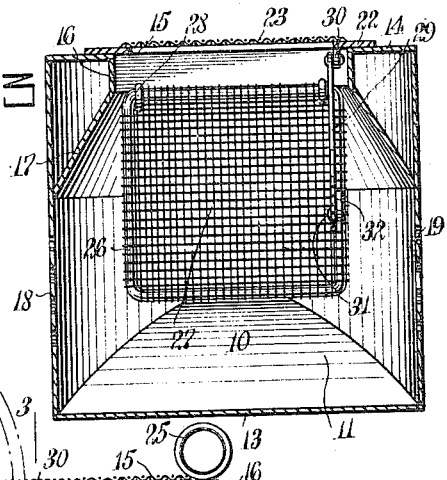
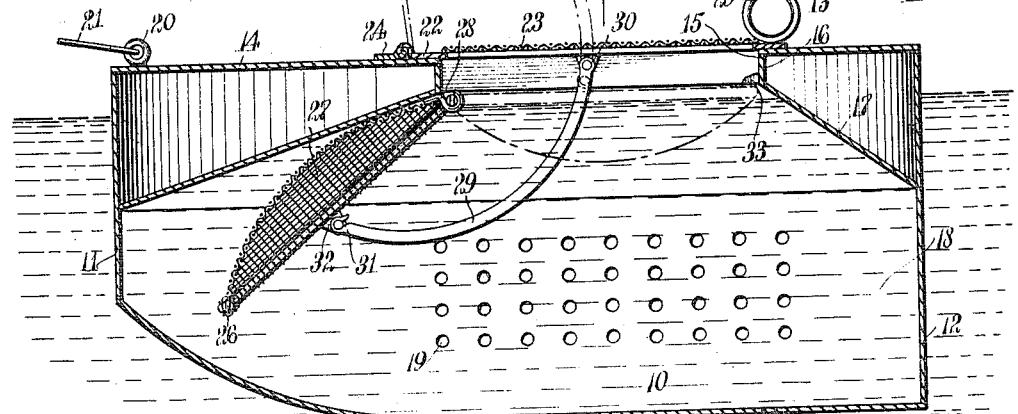

AUGUST CHARLES SEEGER, OF EAST ST. LOUIS, ILLINOIS.

BAIT-RECEPTACLE.

986,229.

Specification of Letters Patent.  Patented Mar. 7, 1911.

Application filed July 22, 1910.  Serial No. 573,196.

*To all whom it may concern:*

Be it known that I, AUGUST C. SEEGER, a citizen of the United States, and a resident of East St. Louis, in the county of St. Clair and State of Illinois, have invented a new and Improved Bait-Receptacle, of which the following is a full, clear, and exact description.

This invention relates to bait receptacles for use in fishing and for like purposes, and has reference more particularly to a device of this class which comprises a casing having an opening for the introduction and removal of the bait, a movable closure for the opening, a dipper for removing the bait from the casing, and an operative connection between the closure and the dipper.

The object of the invention is to provide a simple, strong and durable receptacle for minnows and other kinds of bait which it is desired to keep alive by immersing the receptacle in water, which is so constructed that it can easily be towed while floating in the water, which tends to follow the course in which it is being towed, by means of which the bait can be kept alive for long periods, and which is so constructed that the bait can be easily and rapidly taken therefrom as it is desired for use.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a plan view of an embodiment of my invention; Fig. 2 is a longitudinal section on the line 2—2 of Fig. 1, certain of the parts being shown in different positions in broken outline; Fig. 3 is a transverse section on the line 3—3 of Fig. 2; and Fig. 4 is a perspective view showing a pail used for carrying the receptacle.

Before proceeding to a more detailed explanation of my invention, it should be clearly understood that while the receptacle is particularly useful as a container for minnows used as live bait in fishing, it can also be employed for other kinds of bait, and for different purposes, in which it is necessary to keep alive small animals which live in water. The casing of the receptacle is so fashioned that it will float nearly submerged, so that the body of the casing is practically filled with water, which enters through perforations in the walls. These perforations however, are so proportioned that the water within the casing, while the device is being towed, is still, to obviate the possibility of injuring the live bait. The dipper is operatively connected with the hinged lid or closure of the opening of the casing, so that as the closure is opened, the dipper is swung through the water, and if the bait comes in its path, will scoop up the same and hold it in an operative position in the opening, from which it can be easily removed by the fisherman. If but a few of the bait are left in the receptacle, the dipper can be disconnected from the lid, so that the bait can be taken out by hand from the water in the casing. When the dipper is operatively positioned it acts as a closure for the opening, so that there is no danger of any of the other of the bait escaping through the opening when the lid is displaced.

Certain of the details of construction shown for example herewith, form no part of the invention, and can be varied in accordance with individual preference and special conditions, without departing from the underlying spirit of the invention.

Referring more particularly to the drawings, I provide a receptacle casing 10, fashioned from suitable sheet metal or any other material adapted for the purpose. It is of rectangular cross section and of elongated form, having the front end 11 tapered, and the rear end 12 rounded, so that it approximates the form of the hull of a boat. The bottom 13 is preferably upwardly inclined at the front. The form of the casing permits it to be towed easily through the water. The top 14, has an opening 15, surrounded by a downwardly disposed internal flange 16. To this is secured, by soldering or in any other manner, an annular sheet 17 which extends downwardly and outwardly to the walls 18 of the casing, forming with the walls, the top and the flange, a float chamber surrounding the opening 15, and extending part way to the bottom of the casing. The float chamber is so proportioned that the casing will float in the water with the top 14 slightly above the surface, so that the casing is practically submerged. The side walls are provided with perforations 19 through which the water can enter.

Near the front end or bow, the casing has an eye or ring 20, by means of which a towing line 21 can be attached to the receptacle.

A closure is provided for the opening 15. It consists preferably, of an angular frame 22, having wire screen 23, or any other reticulate body, soldered or otherwise fastened thereon. It is movably secured to the top 14 by means of hinges 24 or in any other suitable manner. It is provided with a handle ring 25, by means of which it can be easily raised and lowered. A dipper is located within the casing, for removing the bait. It comprises an angular frame 26, fashioned from wire or other suitable material, and having a net 27 secured thereto. The net is fashioned from wire screen or any other suitable material. Adjacent to the flange 16, the member 17 has a pair of hinge hooks 28 which movably receive one of the sides of the frame 26, so that the dipper is mounted to swing. A link 29 is pivotally secured to a bracket 30 of the inclosure, and at the other end has a spring hook 31 adapted to engage a bracket 32 carried by the frame 26 of the dipper. In this way, the closure and the dipper are operatively connected so that when the closure is opened and moved to the position indicated in broken outline in Fig. 3, the dipper swings through the water in the casing, into a position under the opening 15. When the closure is in its lowered position, the dipper is inoperatively disposed. A stop 33 is provided on the flange 16, to limit the movement of the dipper and the closure.

A suitable pail 34 having a cover 35 and a carrying handle or bail 36 of the usual construction, is provided for carrying the receptacle. This is necessary, to provide the bait with water when going to and from the fishing ground or under other circumstances in which it is impossible to allow the receptacle to float in the water. I prefer to provide the cover 35 with perforations 37, and as shown for example, it is secured to the pail by means of a suitable hinge 38.

Having thus described my invention, I claim as new, and desire to secure by Letters Patent:

1. A bait receptacle comprising a casing having an opening, a closure pivotally secured adjacent to an edge of said opening, at the outside of said casing, a dipper pivotally secured adjacent to an edge of said opening, within said casing, and serving for the removal of bait from said casing, and a link pivotally secured to said closure and said dipper, and serving operatively to connect the same.

2. A bait receptacle comprising a casing having an opening, a closure pivotally secured adjacent to an edge of said opening, at the outside of said casing, a dipper pivotally secured adjacent to an edge of said opening, within said casing, and serving for the removal of bait from said casing, and a link pivotally secured to said closure and said dipper, and serving operatively to connect the same, said link having at the end adjacent to said dipper a spring hook, said dipper having a projection adapted to be removably engaged by said hook.

In testimony whereof I have signed my name to this specification in the presence of two subscribing witnesses.

AUGUST CHARLES SEEGER.

Witnesses:
EMIL H. KLICK,
W. D. HOFFMAN.